May 23, 1961 W. H. DU SHANE ET AL 2,985,351
VEHICLE ACCESSORY AND MOUNTING THEREFOR
Filed Oct. 15, 1958 2 Sheets-Sheet 1
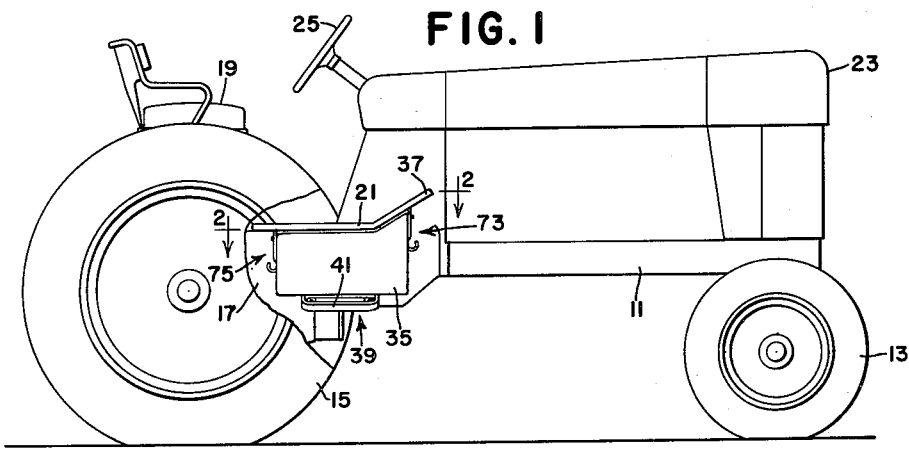
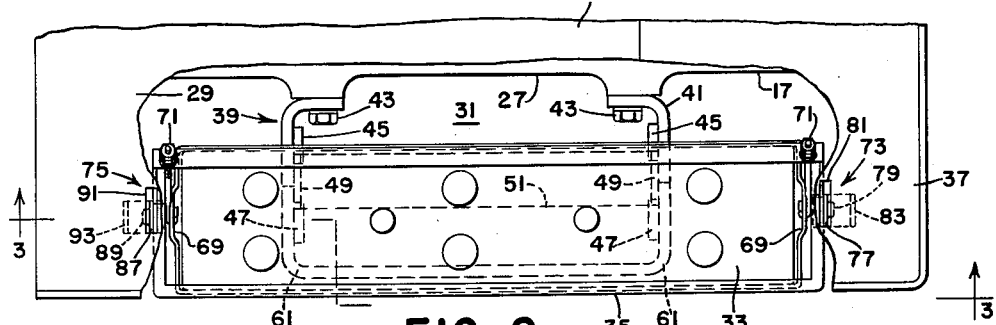
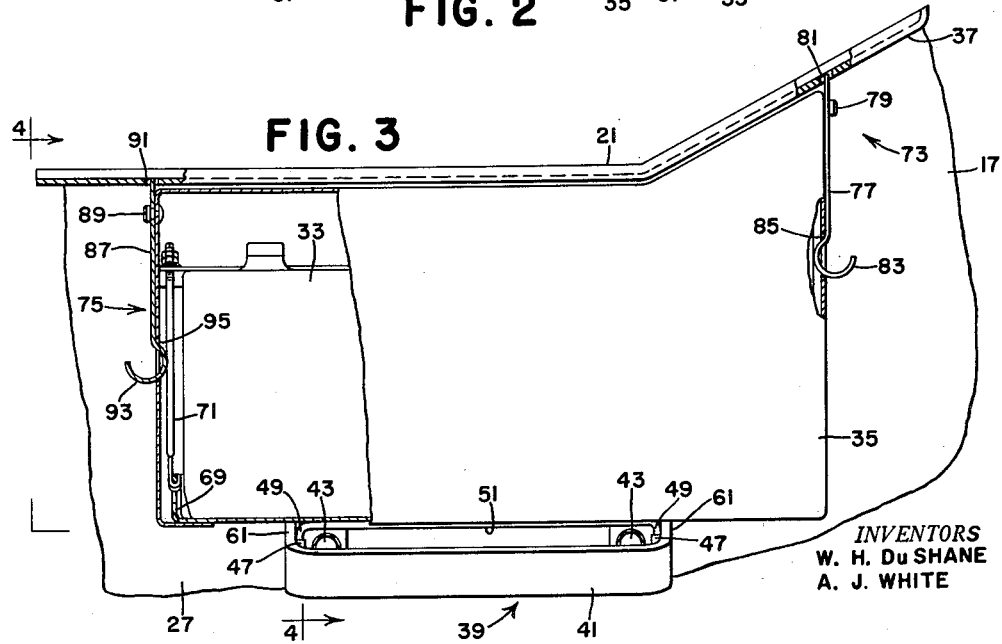
INVENTORS
W. H. Du SHANE
A. J. WHITE

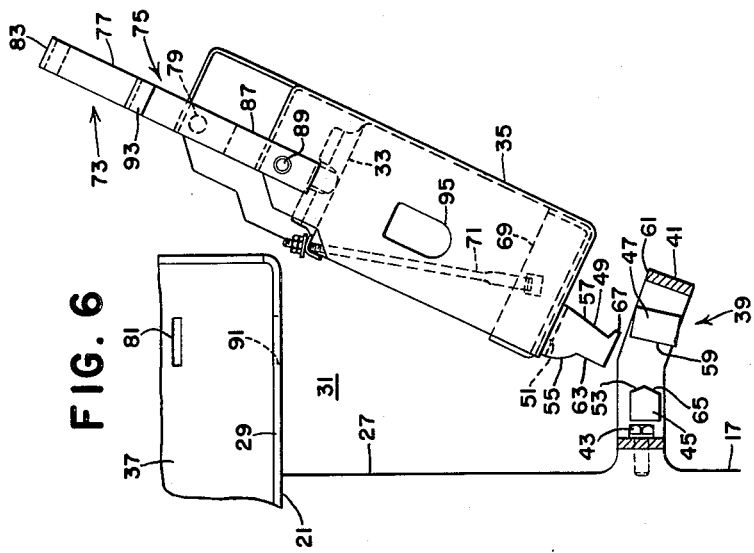
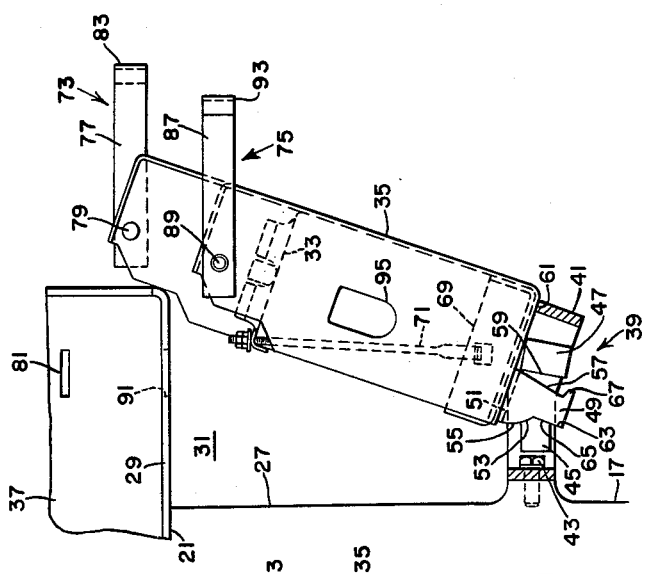
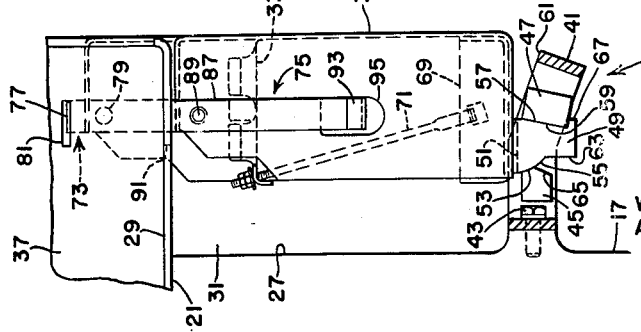

United States Patent Office 2,985,351
Patented May 23, 1961

2,985,351

VEHICLE ACCESSORY AND MOUNTING THEREFOR

Wallace H. Du Shane, Washburn, and Alford J. White, Waterloo, Iowa, assignors to Deere & Company, Moline, Ill., a corporation of Delaware Filed Oct. 15, 1958, Ser. No. 767,320

2 Claims. (Cl. 224—42.41)

This invention relates to vehicle structure and more particularly to a vehicle accessory and a mounting means therefor. Still more particularly, the invention relates to the mounting of an accessory on an agricultural tractor or like vehicle.

The problem of mounting accessories such as batteries, tool boxes, and so forth on agricultural tractors is somewhat more acute than the generally similar problem involved in other automotive vehicles, because in the agricultural tractor space and dimensional limitations are more critical, particularly as respects the width of the tractor, since it is desired that the tractor body be relatively narrow so as to improve the facility with which the operator may view the ground and crops at opposite sides of the tractor as the tractor passes over a field. The major forward part of the tractor body is occupied by the engine and fuel tank and the rear portion, including the operator's seat, does not normally afford a convenient location for such accessories, in view of the recent trend involving the use of rear-mounted hydraulic apparatus, which entails the provision of additional housing structure beneath the seat, which heretofore afforded a convenient place for the location of a battery, tools and so forth.

According to the present invention, the problem noted is solved by the provision of a novel mounting and location for an accessory in a nested position alongside a rear part of the tractor body and below a laterally overhanging portion of the floor board. The invention features supporting means enabling movement of the accessory between a normal protected position to an outer exposed position enabling servicing and other use of the accessory. It is an object of the invention to provide improved supporting means in the nature of a hinge having rockable separable elements enabling upward removal of the accessory when rocked to its outer position. A further and still significant object of the invention resides in improved lock means for normally retaining the stored position of the accessory and selectively operative to release the accessory for swinging or rocking to its outer position, together with means incorporated in the releasable locking means affording handles whereby the accessory may be readily manipulated.

The foregoing and other important objects and desirable features, inherent in and encompassed by the invention, will become apparent as a preferred embodiment thereof is disclosed, by way of example, in the ensuing description and accompanying sheets of drawings, the several figures of which are described immediately below.

Fig. 1 is a side elevation, on a reduced scale and with a portion broken away, illustrating the general environmental structure involved.

Fig. 2 is a plan view, on an enlarged scale and with a portion broken away, as seen generally along the line 2—2 of Fig. 1.

Fig. 3 is a side elevational view, partly in section, as seen generally along the line 3—3 of Fig. 2.

Fig. 4 is a rear view, partly in section, as seen generally along the line 4—4 of Fig. 3.

Fig. 5 is a view similar to Fig. 4 but showing the accessory rocked to its outer position.

Fig. 6 is a similar view showing the manner in which the accessory may be lifted for removal from its support.

The vehicle chosen for purposes of illustration is a typical agricultural tractor having a fore-and-aft or longitudinal body 11 carried on front and rear wheels 13 and 15. The rear part of the body is a transmission case 17 above which is an operator's station including a seat 19 and a floor board 21. The forward part of the body includes radiator grille and engine hood structure 23 behind which a steering wheel 25 is located in generally conventional fashion.

As best seen in Fig. 4, the transmission case 17 has an outer upright part or side wall 27 and the floor board projects laterally outwardly as an upper part or portion 29 which is thus disposed in overhanging relationship to the transmission case and the parts or portions 27 and 29 afford a space 31 for mounting an accessory usable with the tractor. In the present case, this accessory is shown as a storage battery 33 contained in a box-like carrier 35, the top or upper portion of which is open so as to expose the battery terminals, filler caps, etc. As seen in Fig. 3, the floor board slopes upwardly at its forward portion at 37 and the carrier or battery box is shaped to conform. Thus, the carrier with its enclosed battery or whatever other contents may be desired to be used in it, occupies a normal or inward position within the space 31 and below the laterally outwardly overhanging portion 29 of the floor board so that the open top of the carrier is enclosed by the portion 29.

The accessory as thus constituted is carried in this normal position by support means, indicated in its entirety by the numeral 39. This support means includes a generally C-shaped bracket 41 rigidly secured to the casing side wall 27 by cap screws 43 and is positioned an appreciable distance below the overhanging floor board part 29 and, in a sense, defines the bottom of the accessory-receiving space 31. The bracket 41 is of substantial fore-and-aft length so as to afford a shelf underlying the mounted or supported accessory and has front and rear pocket means, each afforded by inner and outer block-like elements 45 and 47 respectively. These elements may be welded or otherwise rigidly secured to the front and rear portions of the bracket 41, and each set or pair of elements 45—47 is spaced laterally apart to enable the downward insertion of a depending element or leg 49 on the bottom of the carrier 35, it being clear that there are a pair of fore-and-aft spaced legs or elements 49. As seen in Figs. 2 and 3, the legs 49 may be the down-turned ends of a fore-and-aft extending member 51.

The nature of and the cooperation among the related elements 45, 47 and 49 are best seen in Figs. 4, 5 and 6. Fig. 4 represents the normal position of the mounted or stored accessory. The outer portion of the element 45 is curved at 53 to cooperate with a complementarily curved inner portion 55 on the element 49, and the opposite or outer edge of the element 49 is straight at 57 to abut at times with the straight inner edge 59 of the cooperating outer element 47. Outer end portions of the bracket or support 41 are inclined outwardly and downwardly at 61, and the relationship of the curved and straight surfaces just described is such that the accessory may be rocked outwardly from the position of Fig. 4 to that of Fig. 5, the bottom of the carrier 35 then resting on the inclined portions 61 of the bracket 41 so that the carrier is disposed in an upwardly and outwardly inclined position with the open top of the carrier 35 clear of or exposed as respects the overhanging floor board portion 29. In addition to the abutment established between the bottom of the carrier box 35 and the inclined portions 61 of the bracket 41, additional abutments are provided as the inner lower edge portion 63 abuts the outer straight edge 65 of the element 45. When the accessory is tilted outwardly to the Fig. 5 position, a toe or lug 67 on the lower part of the element 49 moves inwardly of or clears the bottom of the outer element 47, whereby the entire accessory and its supporting carrier may be lifted as best illustrated in Fig. 6, enabling complete removal of the accessory and so forth from its normal position.

In the present case, the interior lower portion of the carrier 35 has front and rear apertured ears 69 for receiving tie-down bolts 71 by means of which the battery 33 is retained in the carrier. These details will of course vary according to the nature and type of the accessory and may even vary with the particular type of storage battery mounting used. Accordingly, such factors are not intended to limit the scope of the invention.

The mounted accessory is retained releasably in stored or normal position by front and rear releasable lock means designated respectively at 73 and 75. These are substantially identical but in view of minor differences, particularly as to location, they will be described separately.

The front means includes a latch member 77 pivoted at 79 to a forward part of the carrier box 35 and having a normally upwardly extending end received in an aperture 81 in the front portion 37 of the floor board. The member 77 is relatively elongated and has its opposite end generally in the form of a C, as shown at 83, which serves at least two purposes. The front wall of the box 35 is apertured at 85 and the inherent bias in the member 77 retains the member, when in its normal position, with a portion of its C-shaped end 83 in the aperture 85 so as to prevent pivoting of the member about its pivot 79.

The rear means 75 is of similar construction, including a member 87 pivoted at 89 to the rear wall of the box 35 and having its upper end normally cooperative with an aperture 91 in the overhanging part of the floor board. The lower or other end of the member 87 has a C-shaped portion 93 thereon which is normally received in an aperture 95 in the rear wall of the box 35.

When it is desired to rock the carrier from the position of Fig. 4 to that of Fig. 5, it is necessary only for the user to grasp the end portions 83 and 93, respectively, of the members 77 and 87 and spring them forwardly and rearwardly, respectively, so as to free them from their respective apertures 85 and 95, after which the members may be swung so as to withdraw or retract the opposite end portions thereof from the floor board apertures 81 and 91. As will be seen in Fig. 5, the members, being elongated, serve to facilitate manipulation of the accessory, since the members, incident to release thereof from the floor board apertures, have their extended portions projecting outwardly so that the finger-receiving loops or C-shaped portions 83 and 93 are readily accessible. Still further, as seen in Fig. 6, the members 77 and 87 may be swung upwardly to provide handles whereby the accessory may be lifted clear of its supporting means 39.

As will also be apparent from Fig. 4, the toe 67 on each of the elements 49 hooks under the bottom edge of the proximate element 47 and prevents inward movement of the accessory beyond the position illustrated, whereas the outer upper portions of the members 77 and 87 respectively engage the outer portions of the floor board defining the floor board apertures 81 and 91 and prevent accidental outward movement of the carrier. Thus, the carrier is relatively solidly mounted and cannot rattle, vibrate, etc. In the stored or normal position, the carried accessory is completely out of the way and is covered and protected by the overhanging floor board portion. If desired, a similar arrangement may be provided at the opposite side of the tractor, for a second storage battery or other accessories, such as tools, etc.

Features of the invention not categorically outlined herein will readily occur to those versed in the art, as will many modifications and alterations in the preferred embodiment disclosed, all of which may be achieved without departure from the spirit and scope of the invention.

What is claimed is:

1. In a tractor or the like: support means including an upright fore-and-aft wall, a lateral part projecting outwardly from the wall and a C-shaped bracket fixedly disposed in downwardly spaced relation to said part and having front and rear lateral legs respectively including inner wall-proximate horizontally coplanar portions and outer downwardly offset similar wall-remote portions and a fore-and-aft bight between the outer portions and spaced outwardly from the wall at a level below that of said inner portions; a box-like accessory carrier disposed in a normal upright wall-proximate position with its bottom resting on said inner portions and its top overhung by the lateral part, said bottom being of such lateral width as to overhang said outer portions to enable outward rocking of the carrier via its bottom and said legs to a tilted position in which its top clears said lateral part and its bottom engages said outer portions and bight; front and rear elements on the carrier and depending respectively adjacent to the legs; front and rear means respectively on the legs, each including a pair of laterally spaced apart members loosely receiving the respective element from above, each element and its associated members providing inner and outer stop means for limiting rocking of the carrier to its normal and tilted positions, at least one element and one of its associated members being interengageable when the carrier is in its normal position to prevent upward displacement of the carrier from the support and disengageable when the carrier is in its tilted position to enable upward separation of the carrier from the bracket; and means releasably engaged between the carrier and the support means for retaining the carrier against outward rocking to its tilted position.

2. In a tractor or the like; support means including an upright fore-and-aft wall, a lateral part projecting outwardly form the wall and a bracket fixedly disposed in downwardly spaced relation to said part; a box-like accessory carrier disposed in a normal upright wall-proximate position with its bottom overlying the barcket and its top overhung by the lateral part; means at the bottom of the carrier and mounting the carrier on the bracket for rocking of the carrier outwardly to a tilted position in which its top clears said lateral part, said mounting means including cooperative vertically separable elements on the carrier and bracket enabling separation of the tilted carrier from the bracket; and releasable means for retaining the carrier against outward rocking, including a lever having upper and lower ends and pivoted intermediate its ends to the carrier on a fore-and-aft axis between the top and bottom of said carrier, upper means on the lateral part for normally receiving the upper end of the lever, lower means on the carrier for receiving the lower end of the lever, and said lever being so constructed as to enable its lower end to be forcibly displaced from said lower receiving means so that outward swinging of the lever via its lower end causes the upper end of the lever to react inwardly against the upper receiving means so as to act through the lever pivot to rock the carrier toward its tilted position, said upper means and upper end of the lever being so shaped that said upper end ultimately downwardly and inwardly clears the upper means as said lower end is swung further outwardly, and said lower end including handle means by which the carrier in its tilted position is liftable from the bracket.

(References on following page)

References Cited in the file of this patent

UNITED STATES PATENTS

| | | | |
|---|---|---|---|
| 491,706 | Jacobus | Feb. 11, | 1893 |
| 1,430,525 | Weber | Sept. 26, | 1922 |
| 1,546,992 | Oppman | July 21, | 1925 |
| 1,552,320 | Lea | Sept. 1, | 1925 |
| 1,726,996 | Stockfleth et al. | Sept. 3, | 1929 |
| 1,862,714 | Snow | June 14, | 1932 |
| 1,872,621 | Doane | Aug. 16, | 1932 |
| 2,006,666 | Becker | Jan. 5, | 1937 |
| 2,307,634 | Mountjoy | Jan. 5, | 1943 |
| 2,349,466 | Schueren | May 23, | 1944 |
| 2,450,722 | Dirje | Oct. 5, | 1948 |
| 2,874,016 | D'Andrea | Feb. 17, | 1959 |

FOREIGN PATENTS

| | | | |
|---|---|---|---|
| 195,361 | Great Britain | Apr. 26, | 1923 |